United States Patent [19]

Esashi et al.

[11] 3,925,820

[45] Dec. 9, 1975

[54] ENDLESS LOOP TAPE CARTRIDGE FOR USE WITH TAPE EXTRACTION SYSTEMS

[75] Inventors: Hanjiro Esashi, Sendai; Shuji Yoshizaki, Tagajyo, both of Japan

[73] Assignee: Sony Corporation, Tokyo, Japan

[22] Filed: Nov. 22, 1974

[21] Appl. No.: 526,395

Related U.S. Application Data

[63] Continuation of Ser. No. 390,864, Aug. 23, 1973, abandoned.

[30] Foreign Application Priority Data

Aug. 24, 1972 Japan .......................... 47-98834[U]

[52] U.S. Cl. ........................... 360/132; 242/55.19 A

[51] Int. Cl.² .................... G11B 23/04; B65H 17/48

[58] Field of Search ........................ 360/132, 85, 95; 242/55.19 A

[56] References Cited

UNITED STATES PATENTS

| | | | |
|---|---|---|---|
| 3,273,896 | 9/1966 | Maeder | 360/132 |
| 3,423,039 | 1/1969 | Zielke | 242/55.19 A |
| 3,482,792 | 12/1969 | Auld | 360/132 |
| 3,563,483 | 2/1971 | Morita | 360/132 |
| 3,612,422 | 10/1971 | Ito et al. | 242/55.19 A |
| 3,633,837 | 1/1972 | Esashi et al. | 360/132 |
| 3,681,539 | 8/1972 | Eibensteiner | 360/132 |

*Primary Examiner*—Robert S. Tupper

*Attorney, Agent, or Firm*—Lewis H. Eslinger; Alvin Sinderbrand

[57] ABSTRACT

An improved tape cartridge for use in a magnetic recording and/or reproducing apparatus having a tape engaging member for withdrawing a portion of tape from said tape cartridge into operable relation therewith and having at least one drive shaft, said improved tape cartridge comprises a housing having an access opening therein across which a run of the tape is directed. An endless loop of tape is disposed within the housing and is adapted to have a portion thereof withdrawn into operable relation with the magnetic recording and/or reproducing apparatus. The housing additionally includes a storage compartment therein for storing a portion of the endless tape in tortuous or random serpentine configuration and from which the stored portion of tape is adapted to be initially withdrawn into operable relation with the magnetic recording and/or reproducing apparatus. A driving roller-pinch roller combination is positioned within the housing and is operable to transport tape therebetween into the storage compartment; the driving roller being rotatably mounted and adapted to be driven by a drive shaft extending into the tape cartridge from the magnetic recording and/or reproducing apparatus.

10 Claims, 12 Drawing Figures

ENDLESS LOOP TAPE CARTRIDGE FOR USE WITH TAPE EXTRACTION SYSTEMS

This is a continuation, of application Ser. No. 390,864, filed Aug. 23, 1973, and now abandoned.

This invention relates generally to tape cartridges for use in magnetic recording and/or reproducing apparatus, such as video tape recording and reproducing apparatus (VTR), and, in particular, to an improved tape cartridge of the type in which an endless loop of tape is wound.

In a conventional video tape recording and reproducing apparatus, the recording and reproduction of video signals on magnetic tape is preferably effected by a rotary magnetic head which scans skewed record tracks on the tape as said tape is guided on the periphery of a cylindrical guide drum which substantially coincides with the circular path of the rotary head. Preferably, the magnetic tape to be supplied to the magnetic recording and reproducing apparatus is conveniently stored within cassette or tape cartridges, normally of the reel-to-reel type. Accordingly, to achieve such magnetic recording or reproduction of signals, it is necessary to withdraw tape from the cassette or cartridge and to wrap or otherwise load the withdrawn tape about at least a portion of the periphery of the guide drum. One advantageous technique to obtain the automatic loading of tape on the guide drum is disclosed in U.S. Pat. application Ser. No. 113,988, filed on Feb. 9, 1971 and assigned to Sony Corporation, the assignee of the present invention, and which has issued on June 19, 1973 as U.S. Pat. No. 3,740,495. In accordance with that disclosed technique, a tape engaging member of the automatic loading device, or of the magnetic recording and/or reproducing apparatus, extends into an access opening of the cassette or cartridge to thereby engage the tape that extends across the access opening. When the tape engaging member is actuated, movement thereof results in the withdrawal of tape from the access opening whereby the withdrawn tape is loaded upon the guide drum.

In the conventional cassette or cartridge adapted for use with the foregoing type of magnetic recording and/or reproducing apparatus, the magnetic tape is normally stored within such cassette or cartridge upon a supply reel. Additionally, a take-up reel is also provided within the cassette or cartridge and is adapted to receive the tape transported from the supply reel, continued through the magnetic recording and/or reproducing apparatus to the take-up reel. When the take-up reel is driven, tape is transported thereto. Rewinding of the tape is effected by counter-rotation of the supply and take-up reels, generally by driving the supply reel in a reverse direction. It has been found that, although such standard cassettes or cartridges are generally satisfactory, the necessity of rewinding the processed tape from the takeup reel to the supply reel, to permit subsequent re-use of the tape, is often time consuming. Additionally, the rapid rewinding of the tape unnecessarily subjects the tape to undesirable stresses presenting an appreciable danger of possible destruction thereof.

Accordingly, a tape cassette or cartridge has been proposed wherein a single reel of tape is provided, said tape being disposed thereabout in an endless loop. In this manner, the transporting of the tape from the single reel to the magnetic recording and/or reproducing apparatus and then returning the processed tape to the single reel at once permits the processing of the tape and the concurrent rewinding thereof. Thus, a rewinding operation is no longer necessary, thereby permitting an efficient use of time and eliminating hazards heretofore noted.

Of course, the use of such proposed tape cassettes or cartridges in the automatic loading magnetic recording and/or reproducing apparatus of the type generally noted above requires the initial withdrawal of a portion of the tape from the cassette or cartridge to thereby load said magnetic recording and/or reproducing apparatus with tape. It has been found that when a portion of the tape is initially removed from the cassette or cartridge by the automatic loading device, the single reel (or pair or reels) within the cassette or cartridge and about which the endless tape is wound is not necessarily rotated at the same speed at which the tape is withdrawn. Consequently, the wound tape rotates with respect to the reel (or reels) resulting in a tightly wound coil of tape. Unfortunately, if the coil of tape is excessively taut, the tape might not be smoothly or uniformly transported through the magnetic recording and/or reproducing apparatus during the recording or reproduction of signals. Additionally, the tight winding of tape within the cassette or cartridge results in an extreme increase in the frictional contact between the tape and the various and numerous tape guide members encountered by the tape during the transport thereof from, for example, the innermost coil of tape to the access opening of the cassette or cartridge. Such increase in the contact friction presents the undesirable possibility of causing significant defects in the tape when withdrawal and transport thereof is initiated. The non-uniformity in transporting the tape and the defects introduced to the tape because of the excessive contact friction thereon may induce vibration in that portion that is processed by the magnetic tape recording and/or reproducing apparatus, resulting in distortion of the signals recorded on, or reproduced from, the tape. Clearly, if the magnetic recording and/or reproducing apparatus is of the VTR-type, such tape vibration may cause serious distortions in the displayed video picture, such as jitter, or the like.

Therefore, it is an object of the present invention to provide a cassette or cartridge for an endless magnetic tape for use in a magnetic recording and/or reproducing apparatus.

It is another object of the instant invention to provide a cassette or cartridge for an endless magnetic tape wherein vibration of the tape transported from the cassette or cartridge through magnetic recording and/or reproducing apparatus is eliminated.

A further object of the present invention is to provide a cassette or cartridge for an endless tape wherein a portion of said tape is stored in a storage compartment in tortuous or random serpentine configuration whereby said stored portion of tape is withdrawn from the storage compartment and loaded onto a magnetic recording and/or reproducing apparatus.

A still further object of the present invention is to provide a cassette or cartridge for an endless magnetic tape to be used with a magnetic recording and/or reproducing apparatus wherein a coil of tape within the cassette or cartridge is not tightly wound in response to the withdrawal of a portion of said tape to effect loading thereof onto the magnetic recording and/or reproducing apparatus.

Various other objects and advantages of the invention will become clear from the following detailed description of exemplary embodiments thereof, and the novel features will be particularly pointed out in connection with the appended claims.

In accordance with this invention, there is disclosed a tape cassette or cartridge for use in a magnetic recording and/or reproducing apparatus wherein a tape engaging member of said apparatus is provided to withdraw a portion of tape from said cassette or cartridge and to load said withdrawn tape into operable relation with said apparatus, the cassette or cartridge being comprised of a housing having an access opening therein across which a run of tape is directed and additionally having an opening to receive a drive shaft of said magnetic recording and/or reproducing apparatus; an endless loop of tape disposed within the housing and adapted to permit a portion thereof to be withdrawn into operable relation with said magnetic recording and/or reproducing apparatus; a storage compartment included in the housing for storing a portion of the endless tape in tortuous or random serpentine configuration and from which compartment the stored portion of tape is adapted to be initially withdrawn into operable relation with the magnetic recording and/or reproducing apparatus; and a driving roller-pinch roller combination adapted to transport tape therebetween into the storage compartment, the driving roller being rotatably driven by the drive shaft of said magnetic recording and/or reproducing apparatus.

In one exemplary embodiment of the instant invention, the endless tape is wound about a reel rotatably mounted in the cassette or cartridge housing such that the innermost coil of wound tape is transported from the cassette or cartridge to the magnetic recording and/or reproducing apparatus and thence through the storage compartment to the outermost coil of wound tape. In another embodiment of the instant invention, the endless tape is wound about a pair of rotatable reels.

Although the instant invention is directed to a cassette or cartridge for an endless tape, it is contemplated that such cassette or cartridge may be employed in conventional magnetic recording and/or reproducing apparatus designed for reel-to-reel cassettes.

The invention will be more clearly understood by reference to the following detailed description of exemplary embodiments thereof in conjunction with the accompanying drawings in which.

Figure 11:
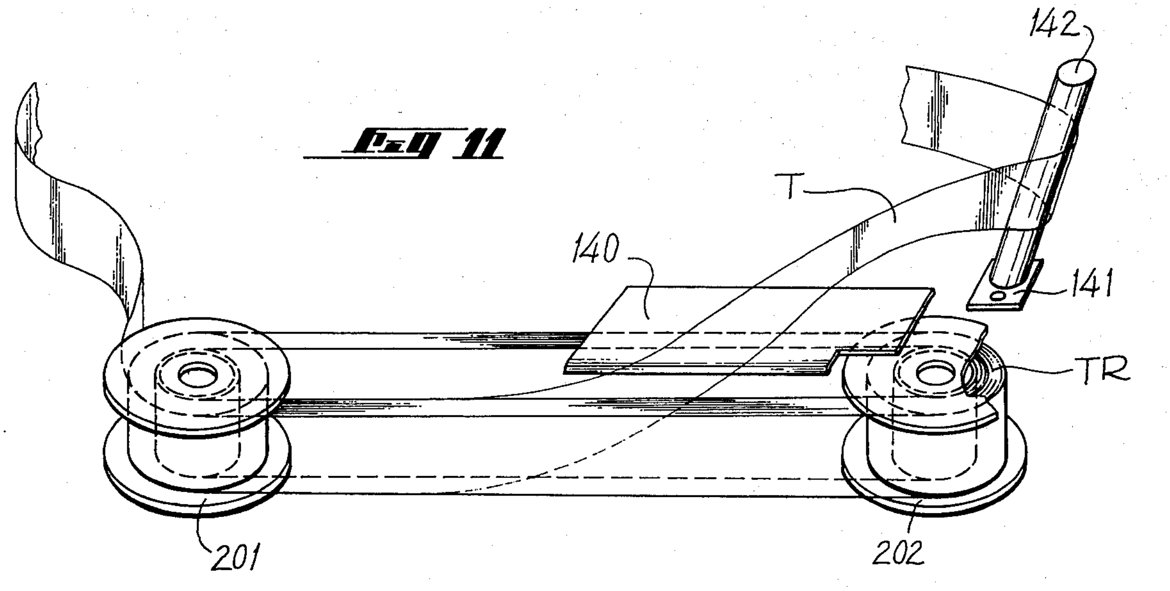
Figure 3:
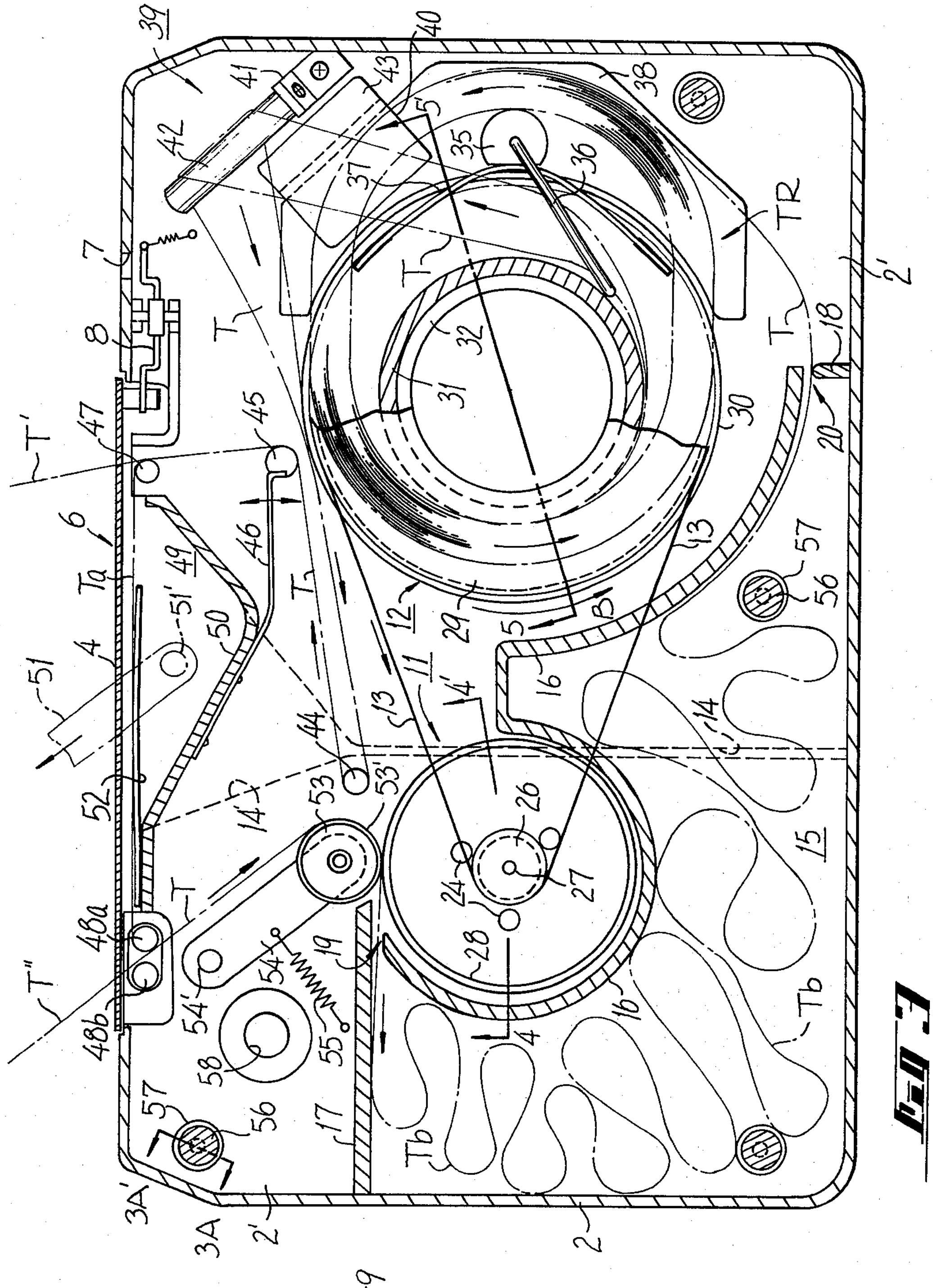
Figure 3A:
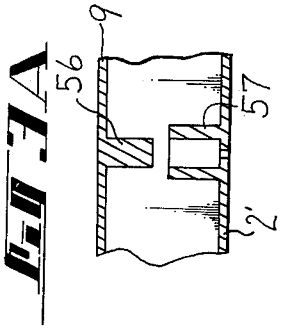
Figure 4:
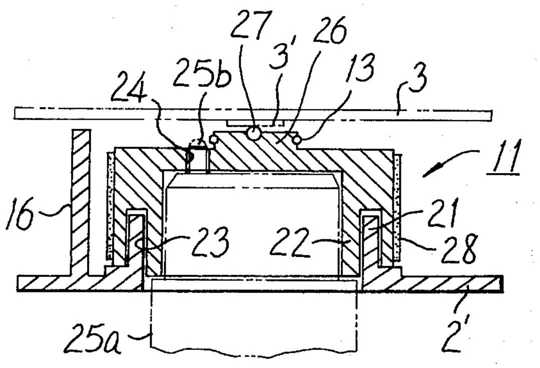
Figure 7:
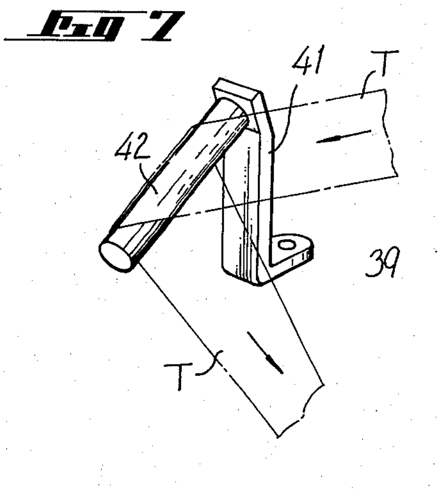
Figure 5:
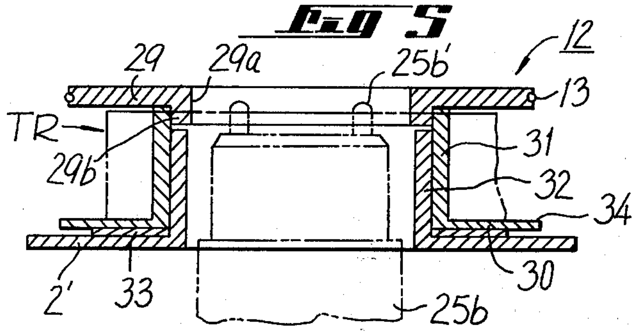
Figure 8:
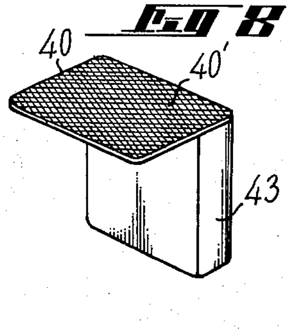
Figure 10:
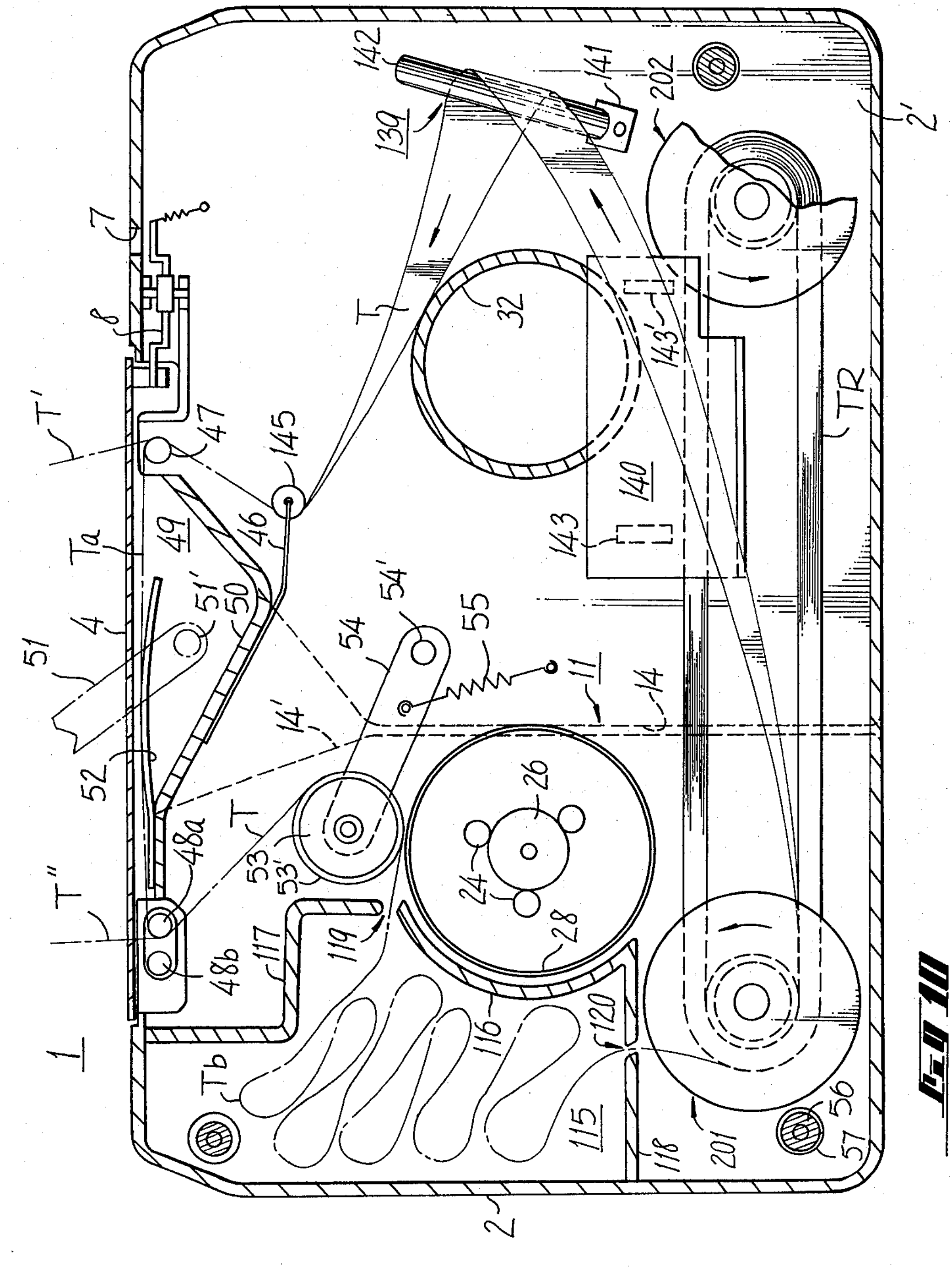

FIG. 3, including 3A, is a top plan view of a tape cassette or cartridge in accordance with the present invention;

FIGS. 4 and 5 are sectional views of portions of the apparatus illustrated in FIG. 3;

FIGS. 6 through 9 are perspective views of various components employed in the apparatus depicted in FIG. 3;

FIG. 10 is a top plan view of a tape cassette or cartridge in accordance with another embodiment of the present invention; and FIG. 11 is a perspective view of a portion of the apparatus depicted in FIG. 10.

Figure 1:
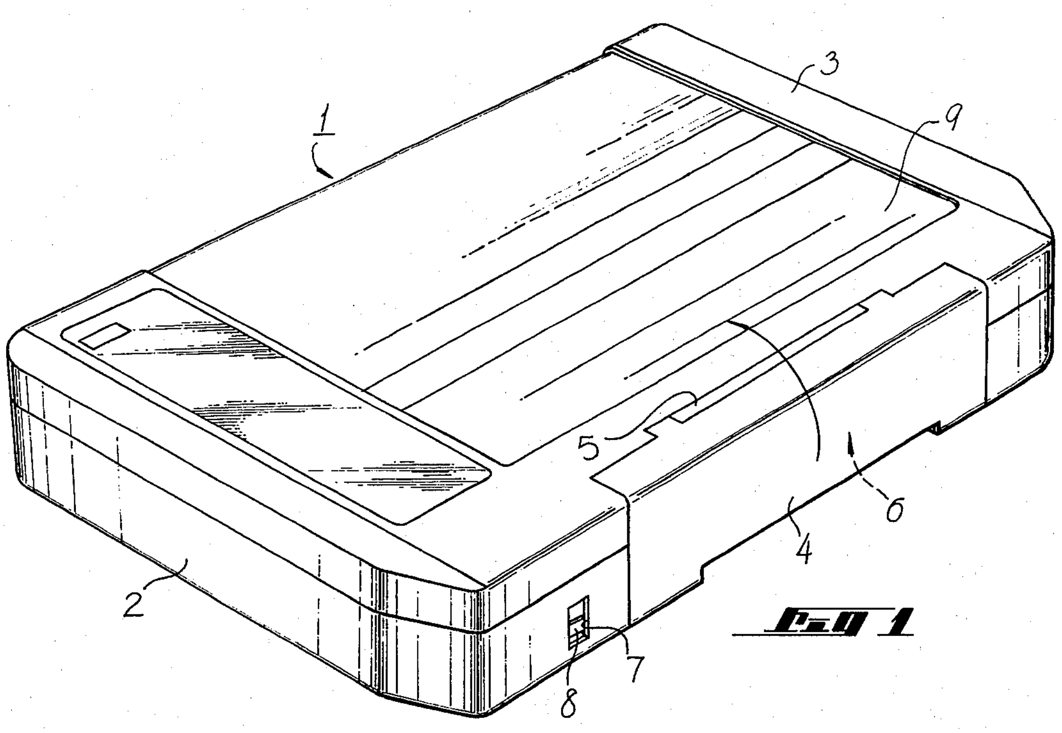
FIG. 1 is a perspective view of a tape cassette or cartridge in accordance with an embodiment of the present invention.

Referring now to the drawings, and in particular, to FIG. 1, there is illustrated a tape cassette or cartridge in accordance with the present invention. The illustrated cassette or cartridge comprises a housing 3 of flat, substantially rectangular configuration which may be formed of a suitable plastic and is composed of a top wall 9, a peripheral wall 2 and a bottom wall, not shown. The peripheral wall 2 and adjacent portions of top wall 9 and the bottom wall are cut away along one relatively long side of rectangular housing 3 to define an elongated access opening or cut out. As will soon be described herein below, the magnetic tape disposed within housing 3 admits of a run so as to traverse the access opening. Said tape run is here depicted by reference numeral 6.

A lid 4 may be provided for normally closing the acess opening and thereby protecting the magnetic tape contained in housing 3 from exposure to dust and from contact with foreign matter that might otherwise be transferred thereto during manual handling of the cassette or cartridge 1. The lid 4 may be pivotally attached to housing 3, as at 5, for swinging between an open position, not shown, and the closed position illustrated in FIG. 1. As is apparent, the closed position of lid 4 extends across and substantially closes the access opening in housing 3. A releasable latching mechanism may be provided for holding lid 4 in its closed position, with such latching mechanism being released and the lid removed to its open position upon the installation of cassette or cartridge 1 in a magnetic recording and/or reproducing apparatus with which the cassette or cartridge is to be used. An illustrative latching mechanism may include a latch lever 8 which projects into the access opening to engage a keeper on the lid 4. An aperture 7 is formed in peripheral wall 2 so that latch lever 8 extends across such aperture and is rockable to be released from the lid keeper in response to the insertion of an appropriate actuating element into aperture 7.

The cassette or cartridge 1 is illustrated in FIG. 1 is normally provided with two reels in either side by side or overlying relationship for the transfer of magnetic tape from a supply reel to a take-up reel. As used in a magnetic recording and/or reproducing apparatus, the path traversed by the magnetic tape from the supply reel to the take-up reel provided within housing 3 normally traverses an operating portion of such apparatus. More particularly, when the cassette or cartridge is operably disposed with respect to a video tape recording and reproducing device, of the type descrived in the aforenoted U.S. Pat. No. 3,740,495, the cassette or cartridge cooperates with the VTR device in the manner depicted in FIG. 2. As illustrated therein, a supply reel 102 is rotatably mounted on the bottom wall of the housing and a take-up reel 104 is, likewise, rotatably mounted in side by side relation with respect to supply reel 102. Bottom flanges 106 and 108 are provided on the supply reel and take-up reel, respectively, to suitably support the tape on the respective reels. A partition 50 extends upwardly from the bottom wall of the housing to define the access opening or cut-out 49 of the cassette or cartridge. In the unloaded mode, the magnetic tape is guided by guide pins 47 and **48*a* along run Ta to traverse the access opening 49. Accordingly, the magnetic tape extends from supply reel 102 across the access opening 49 to take-up reel 104**.

The magnetic recording and/or reproducing apparatus contemplated for use with the cassette or cartridge 1 preferably comprises a cylindrical tape guide drum 112 about which the magnetic tape is operably positioned. Additionally, the magnetic recording and/or reproducing apparatus is provided with an automatic loading device to effect withdrawal of a portion of the tape from cassette or cartridge 1 and to advance the withdrawn tape into the proper relationship with respect to magnetic guide drum 112. The automatic loading device generally includes a support member 117 which is preferably in the form of a ring, as shown, and which is rotatable about guide drum 112 in a circular or arcuate path that extends between drum 112 and cassette or cartridge 1. The support ring 117 may be disposed eccentrically with respect to guide drum 112, as shown, to provide a relatively large space therebetween for accommodating capstan 116, head 115 and tape guides 113 and 114. Support ring 117 is rotatably supported by grooved rollers 121 which engage the inner periphery of ring 117.

Extending upwardly from support ring 117, preferably normal to the plane of rotation of the ring, is a tape engaging member 119 which, in the illustrated apparatus, is a roller. The roller is shown to be rotatably mounted on the free end of an arm 119*a* which is pivoted at its other end on support ring 117. The arm 119*a* may be urged outwardly by suitable spring biasing devices to the position relative to ring 117 as shown in the solid lines in FIG. 2. In this position, it is appreciated that a gap is normally provided between capstan 116 and roller 119. A suitable mechanism, not shown, is provided to swing arm 119*a* and engage roller 119 with capstan 116 as depicted by the broken lines identified as roller 119'. Such operation is effected in response to the actuation of suitable control means for initiating either a recording or a reproducing operation of the illustrated apparatus.

The support ring 117 further carries a plurality of tape guide members 120, for example, in the form of pins which extend upwardly from the ring at spaced apart locations in trailing relation to roller 119, as depicted by the solid lines. When ring 117 is rotated in the clockwise direction, as represented by the arrow A, the tape guide members 120 obtain the configuration depicted in broken lines. It is appreciated that in this manner, tape is deployed from the cassette or cartridge 1 about guide drum 112 through a tape run L.

Figure 2:
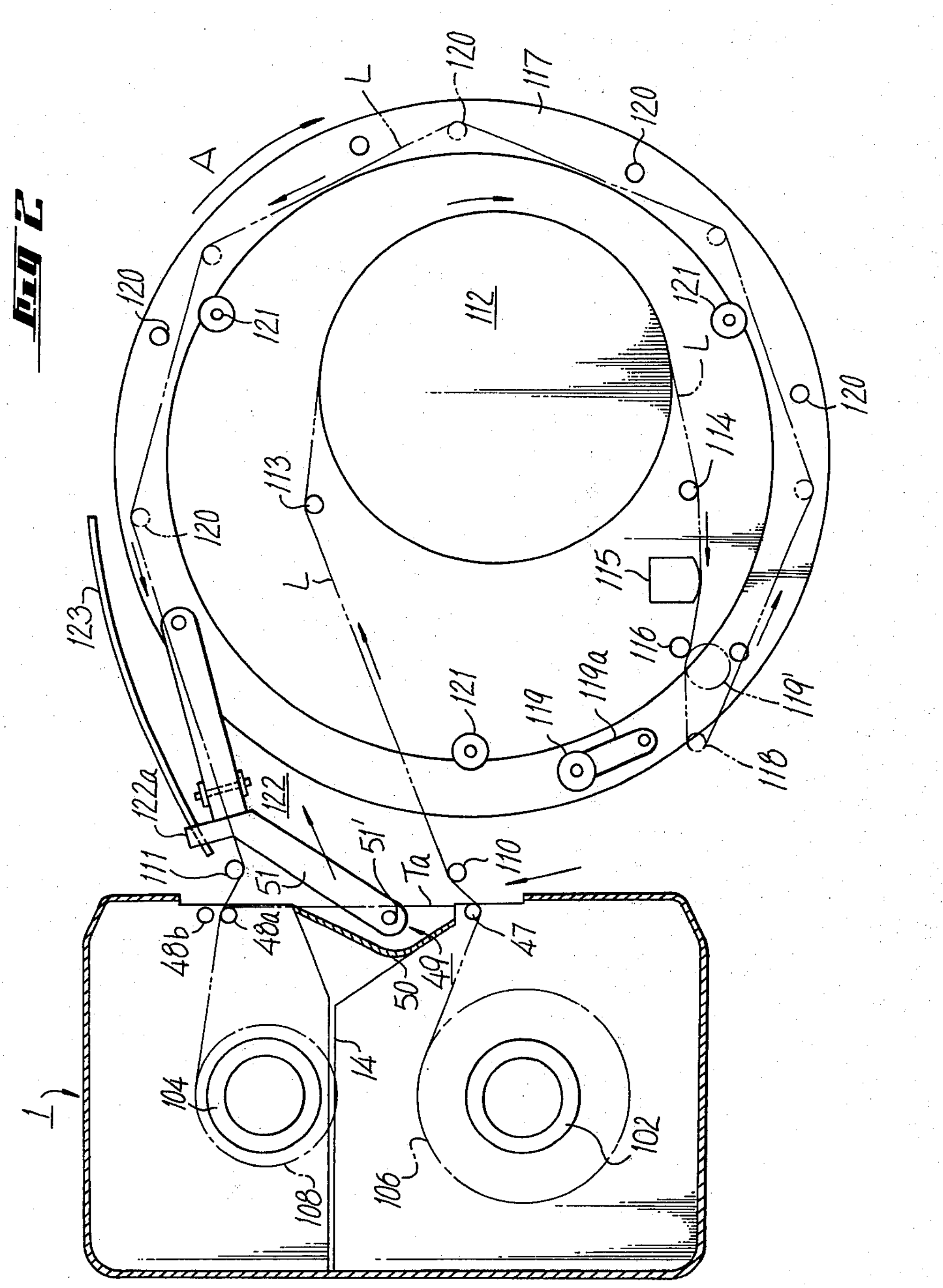
FIG. 2 is a schematic top plan view of a magnetic recording and/or reproducing apparatus provided with a tape loading and unloading device and operable with a cassette or cartridge of the type employed by the prior art.

The automatic tape loading device of the illustrated apparatus is further shown to include an initial tape engaging member 122 that includes a lever 51 having an angulated portion 122*a* guided in guide slit 123. Lever 51 is mounted upon arn arm secured to ring 117. The free end portion of lever 51 includes an upstanding tape engaging member or pin 51' that is movable along a transport path substantially parallel to the arcuate path of support ring 117. Accordingly, when ring 117 is initially rotated in the clockwise direction, tape engaging pin 51' engages that run of tape Ta extending between guide pins 47 and 48*a* of cassette or cartridge 1 and withdraws said tape from the cassette or cartridge a distance defined by the longitudinal dimension of slit 123. When ring 117 is sufficiently rotated such that the angulated arm 122*a* is disposed at the opposite extremity of slit 123, the tape extending from supply reel 102, about tape engaging pin 51' to take-up reel 104 is in condition to receive roller 119 as ring 117 is further rotated. Thus, continued clockwise rotation of ring 117 deploys the run of tape L about roller 119 and permits the run of tape to be further withdrawn from the cassette or cartridge 1. Finally, ring 117 is arrested at the clockwise rotation thereof depicted by roller 119°. A suitable mechanism is then actuated to bring roller 119' into contact with capstan 116 to thereby impart a driving force to the run of tape L deployed about guide drum 112. In this configuration, signals may be magnetically recorded on or reproduced from the tape drawn from cassette or cartridge 1. A more detailed explanation of the magnetic recording and/or reproducing apparatus typically employed with the cassette or cartridge 1 illustrated in FIG. 2 is set forth in the aforenoted U.S. Pat. application Ser. No. 113,988.

It is a feature of the present invention to provide an improved cassette or cartridge for an endless magnetic tape that may be particularly utilized with the aforedescribed magnetic recording and/or reproducing apparatus that has heretofore been operable with conventional reel-to-reel cassettes. Referring now to FIGS. 3, there is illustrated a top plan view of one embodiment of a cartridge 1 in accordance with the present invention. The external appearance of housing 3 is similar to the conventional cassette or cartridge previously described with respect to FIG. 1. The interior portion of housing 3 is comprised of reel 12, driving roller 11, storage compartment 15, pinch roller 53, damper means 37, and access opening 49. Reel 12 is rotatably mounted on the bottom wall 2' of housing 3. Similarly, driving roller 11 is rotatably mounted on the bottom wall 2' and includes a pulley 26 thereon. An endless belt or cable 13 is deployed about pulley 26 and reel 12 and is adapted to drive the reel in the direction indicated by the arrow 3 when the driving roller 11 is rotatably driven in the direction indicated by the arrow C. Accordingly, belt or cable 13 is, preferably, a friction belt. As will be described in greater detail, hereinbelow, driving roller 11 is mounted in overlying relationship with respect to an opening in bottom wall 2', the latter being adapted to receive a drive shaft included in the magnetic recording and/or reproducing device of the type for which the instant invention finds ready application. Reel 13 is likewise mounted in overlying relationship with respect to an opening in bottom wall 2'. However, as will soon be appreciated, driving roller 11 is adapted to be rotatably driven by the drive shaft received by the first mentioned opening in bottom wall 2', whereas reel 12 is designed to be free of the drive shaft received by the second mentioned opening in the bottom wall 2'.

A guide groove 14, 14', formed on the bottom wall 2' serves to guide the cartridge 1 when said cartridge is inserted into the magnetic recording and/or reproducing apparatus in the conventional manner.

The storage compartment 15 is defined by upstanding walls 16, 17 and 18, which are preferably molded on the bottom wall 2' of housing 3. Wall 16 is spaced from each of walls 17 and 18 to define slits 19 and 20, respectively, therebetween to permit tape T to pass therethrough. That portion of the tape Tb stored within storage compartment 15 is disposed in the illustrated tortuous or random serpentine configuration between slits 19 and 20, respectively. As will soon be described, the stored portion of the tape Tb is approximately equal to that portion of tape withdrawn from the housing 3 by the tape engaging members of the magnetic recording and/or reproducing apparatus.

A better understanding of the manner in which driving roller 11 is rotatably mounted on bottom 2' may be obtained by referring to FIG. 4 which is a sectional view of a portion of the apparatus illustrated in FIG. 3 taken along lines 4—4. Driving roller 11 includes a circular hub 22 having an annular groove 23 therein. Groove 23 admits of rotatable engagement with upstanding annular abutment 21 provided on the bottom wall 2' of housing 3. Annular abutment 21 is provided with a shoulder portion upon which is seated the outer portion of hub 22. The top wall of roller 11 is provided with a plurality of apertures or pin holes 24 through which pins **25*b*' of drive shaft 25*a* extend. It is recognized that drive shaft 25*a* is included in themagnetic recording and/or reproducing apparatus and is permitted free passage through the opening provided therefor in bottom wall 2'. The top wall of roller 11 is also provided with a pulley portion 26 upon which a bearing 27 is mounted. It is appreciated that bearing 27 may be any suitable bearing member such as a steel ball or the like. Bearing 27 is maintained in its illustrated configuration by a table 3' depending from the upper wall of housing 3. Thus, the combination of annular abutment 21, depending table 3' and bearing 27 permits reel 11 to be rotatably mounted on the bottom wall 2' with relatively little friction therebetween. The endless cable or belt 13 is deployed about pulley portion 26 of driving roller 11. Additionally, a resilient material 28, such as rubber, is wrapped about the outer periphery of roller 11** for a purpose to be described hereinbelow.

As aforenoted, the endless cable or belt 13 deployed about pulley portion 26 of driving roller 11, extends about reel 12. A sectional view of reel 12 taken along lines 5—5 of FIG. 3 is shown in detail in FIG. 5. The reel is provided with an upper flange 29 having a V-shaped groove about the periphery thereof to receive the endless cable or belt 13. Upper flange 29 is provided with a central aperture **29*a*. A bottom flange portion 30 includes a hub 31 which is fixedly secured to the depending hub 29*b* of upper flange 29 by suitable securing means such as cement. The combination of bottom flange 30 and hub 31 is rotatably mounted on an axle stub 32 formed on bottom wall 2' of housing 3. A suitable spacer element 33 is positioned between the bottom flange 30 and the upper surface of bottom wall 2'. The combination of bottom flange 30 and hub 31 is permitted low friction rotation upon the axle stub 32. As is illustrated, the drive shaft 25*b* normally provided in the magnetic recording and/or reproducing apparatus for engagement with the supply reel of the conventional cassette or cartridge normally employed therewith has not, in any way, engaged or otherwise rotatably contacted reel 12**.

It is apparent that magnetic tape is wound about reel 12, said wound tape being identified by the reference numeral TR. Accordingly, the upper surface of bottom flange 30 is coated with material having a low coefficient of friction such as polytetrafluoroethylene.

Referring again to FIG. 3, damper means 37 are provided for extending the path defined by the wound tape TR about reel 12. As will soon become apparent, the damper means 37 are provided to prevent the wound tape TR from being excessively taut when tape is withdrawn from the cassette or cartridge 1 and wrapped about the guide drum 112 of the magnetic recording and/or reproducing apparatus and is further provided to prevent slippage of transported tape which could result in undesired vibration of the tape resulting in deleterious effects upon the recorded or reproduced signals. Accordingly, damper means 37 comprises a generally rectangular member formed of resilient material and secured to a center post 35. The center post is mounted on the bottom wall 2'. Additionally attached to center post 35 is a tape separator 36 about which tape T is guided from the innermost coil of wound tape TR and transported to further guide means.

Figure 9:
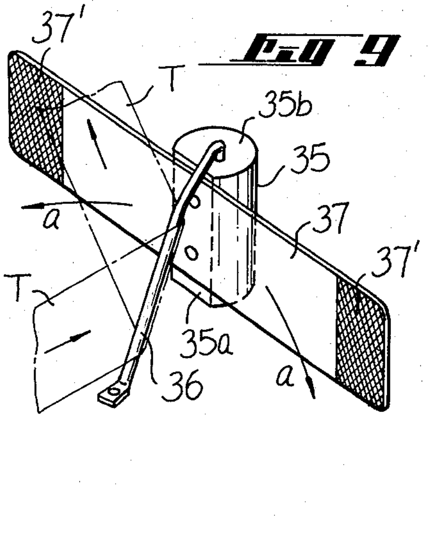

The damper means 37 and tape separator 36 are illustrated in greater detail in the perspective diagram thereof represented in FIG. 9. Tape separator 36 is here illustrated as an angularly disposed rod secured to the top portion **35*b* center post 35 and additionally secured to the bottom wall 2' of housing 3 by conventional securing means, such as screws or the like. The resilient material of which damper means 37 is constructed normally assumes a generally rectangular configuration as illustrated in FIG. 9**. The arrow *a* represents the bending moment exerted upon the damper means 37 when said damper means is positioned internally of the wound tape TR. Preferably, the damper means is formed of a resilient synthetic resin and the end portions 37' thereof are preferably coated with a substance having a low coefficient of friction, such as polytetrafluoroethylene. As is now appreciated, the extremities of damper means 37 cooperate with hub 31 of reel 12 and the rounded portion of center post 35 to define an extended path for the wound tape TR. Consequently, the extended path of the wound tape is of generally oval configuration to thus permit ready access to the innermost coil of tape whereby said innermost coil may be guided about tape separator 36 and then transported to further guide means and then into operable relation with respect to the magnetic recording and/or reproducing apparatus. Although FIGS. 3 and 9 represent the damper means 37 as being secured to a relatively flat portion **35*a* of center post 35, it is appreciated that the center post may be completely cylindrical or, alternatively, that portion of the center post that receives the damper means 37 may admit of a somewhat concave shape to efficaciously accommodate the resilient member when disposed in its curved configuration. Additionally, the unitary damper means 37 may be replaced by individual damping members, each secured to center post 35** or otherwise supported interiorly of the wound tape TR.

A tape guide member 39 is provided to receive the tape T transported thereto from the innermost coil of wound tape TR and separated by tape separator 36. The tape guide member 39 serves to direct the separated tape about tape guide pins or rollers 44, 45 and 47 to thus permit the tape to be disposed in a run Ta extending across access opening 49, or along run T' into operable relation with the magnetic recording and/or reproducing apparatus. The tape guide member 39 is preferably positioned in a suitable corner of the cassette or cartridge and is illustrated in greater detail in the perspective view thereof of FIG. 7. The tape guide member preferably comprises a slant bar 42 secured to a support therefor 41, the latter being mounted on the bottom wall 2' of the housing 3 by a screw or the like. It is apparent that slant bar 42 and tape separator 36 cooperate to guide the separated tape from the wound reel of tape TR and to reverse the transport direction of the guided tape while maintaining a predetermined surface of the tape T in desired position. More particularly, that surface of tape TR remote from the axis of hub 31 is rotated by tape separator 36 to be substantially parallel to the top wall 9 of housing 3. Slant bar 42 serves to return said surface of the tape to a position remote from the axis of hub 31 while reversing the transport direction of the separated tape. Tape T is thus transported in the direction represented with the arrows.

Figure 6:
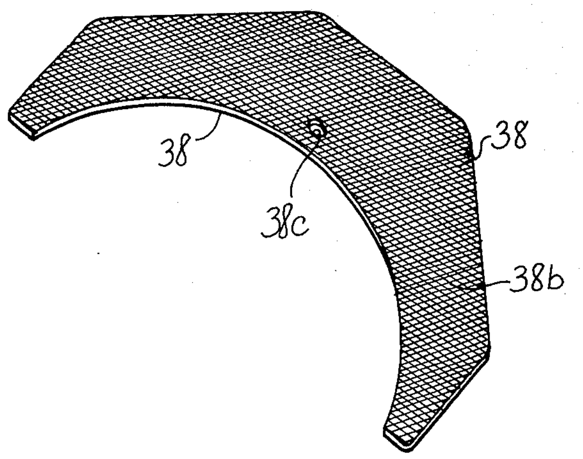

Referring again to FIG. 3, there is illustrated a guide plate 38 mounted upon the bottom wall 2' and adapted to support that portion of wound tape TR that extends from reel 12. Guide plate 38 is elevated above the bottom wall 2' a suitable distance such that the upper surface of the guide plate is parallel to the upper surface 34 of bottom flange 30 of reel 12. A perspective view of guide plate 38 is illustrated in FIG. 6. As there illustrated, the guide plate is provided with an aperture 38 to receive a suitable screw whereby center post 35 may be mounted on the guide plate and thus secured to the bottom wall 2'. As the guide plate is adapted to support the wound tape TR on the upper surface thereof, and as said wound tape is adapted to be rotated thereover, the upper surface of the guide plate 38 is preferably provided with a coating of **38*b* of a substance having a relatively low coefficient of friction, such as polytetrafluoroethylene. Those of ordinary skill in the art will readily appreciate that guide plate 38 may, alternatively, be molded from bottom wall 2'. Thus, the extended portion of wound tape TR resulting from the forces exerted on the wound tape by damper means 37 is preferably disposed for relatively low frictional rotation over the guide plate 38.**

Referring once again to FIG. 3, the cassette or cartridge illustrated therein is additionally provided with shield means 43 for shielding that portion of the tape run, extending from tape separator 36 over the wound tape TR, from contact with the wound tape. The shield means is best illustrated in the perspective view provided in FIG. 3 and is seen to comprise a suitable support extending upwardly from bottom wall 2' and having a plate 40 secured or otherwise mounted on the top portion of the vertical support. Preferably, the vertical support is mounted upon bottom wall 2' in close proximity to guide plate 38 such that the top plate 40 may extend over the upper plane defined by the wound tape TR. That portion of the tape T transported about tape separator 36 to tape guide member 39 passes over the upper surface 40' of the plate 40 of the shield means 43. To minimize friction between the transported tape T and the upper surface 40' of plate 40, said upper surface is coated with a substance having a relatively low coefficient of friction, such as polytetrafluoroethylene. Consequently, the magnetic coated surface of the tape T is protected by plate 40 from defects that might occur as a result of abrasions to the magnetic surface caused by contact between the transported tape T and the wound tape TR.

Pinch roller 53 is rotatably mounted on a pivotable arm 54 in juxtaposition to driving roller 11. The pinch roller 53 is adjacent to roller 11, and, as will soon be appreciated, is cooperable with the roller for transporting tape Tb therebetween into storage compartment 15. The arm 54 on which the pinch roller 53 is rotatably mounted is pivotably secured to the bottom wall 1' by a conventional pivot pin 54'. A spring biasing force is exerted upon arm 54 by spring means 55 to normally bias the pinch roller into contact with the peripheral surface of driving roller 11. The operable surface of the pinch roller that contacts the driving roller is preferably provided with a layer of resilient rubber to thereby prevent the introduction of marring defects to the tape Tb transported thereby.

It is recognized thatt the endless loop of tape retained within housing 3 of the cassette or cartridge 1 should preferably be subjected to uniform tension for each manufactured unit. However, when the elemental components comprising the illustrated cassette or cartridge are assembled, the possibility exists that various ones of such components might differ in exact size or precise location among various manufactured units. To accommodate the corresponding variations in tape tension attributed to such differences in component size and location, a tape tension guide 45 is provided to exert a tensioning force on the run of tape T deployed thereabout. Tape tension guide 45 may, for example, comprise a pin secured to flexible arm 46, the latter being mounted upon the partition 50 upwardly by extending from bottom wall 2'. The flexible arm 46 is adapted for bi-directional movement, as indicated by the arrows, to thus permit the appropriate tensioning force to be exerted by the tension guide 45, as needed. It is apparent that partition 50 defines the access opening 49 which accommodates tape engaging member 51' extending from lever 51 of the magnetic recording and/or reproducing apparatus.

Tape guides 47 and **48*a* are seen to be positioned at opposite ends of the access opening 49** and, as is recognized, are normally provided with a run of tape T*a* extending therebetween when the cassette or cartridge 1 admits of its unloaded mode. In the illustrated apparatus, a flexible member 52 secured to partition 50 extends substantially parallel to the run of tape Ta to present an element of resistance to said run of tape to thereby prevent undesirable slackening thereof when the cassette or cartridge admits of its unloaded mode.

FIG. 3 further illustrates lid 4 in its closed position whereby latch lever 8 engages the keeper on thelid. Additionally, a further tape guide **48*b* is provided adjacent tape guide 48*a* to guide tape T returning to the cassette or cartridge 1 along tape run T'' when tape T is loaded about guide drum 112** of the magnetic recording and/or reproducing apparatus.

To permit the proper assembly of housing 3, an upstanding cylindrical element is provided on bottom wall 2' to receive a corresponding and depending member 56 provided on top wall 9. The cylindrical element 57, as well as the depending member 56, may preferably be molded from the respective bottom and top walls of housing 3. The mating engagement of depending member 56 with cylindrical element 57 assures the proper alignment of the walls of housing 3. Additionally, an aperture 58 is provided to prevent theunintentional or accidental erasure of a signal recorded on the magnetic tape T.

In operation, the tortuous run of tape Tb is normally provided in storage compartment 15 when the tape within cassette or cartridge 1 is not loaded about the operating elements of the magnetic recording and/or reproducing apparatus. Accordingly, in its normal condition, the tape T normally extends from the innermost coil of wound tape TR about tape separator 36, to tape guide member 39, about guide pin 44, about guide members 47 and 48a, about the peripheral surface 28 of driving roller 11, through slit 19 to storage compartment 15 and thence through slit 20 to return as the outermost coil of wound tape TR. It is appreciated that in this condition, the spring biasing force exerted upon arm 54 by spring 55 biases the pinch roller 53 into contact with driving roller 11 and thus into pressing contact with the tape T therebetween. When the cassette or cartridge 1 is inserted into the magnetic recording and/or reproducing apparatus, suitable means may be provided in such apparatus to extend within aperture 7 of housing 3 to thereby remove latch lever 8 from the keeper lid 4. Consequently, lid 4 is permitted to pivot about its pivotal connection to the upper wall 9 of housing 3 whereby the run of tape T*a* extending about guide pins 47 and 48*a* and across access opening 49 is exposed to the magnetic recording and/or reproducing apparatus. Prior to the loading of the tape about guide drum 112, for example, tape engaging member 51′ extends upwardly into access opening 49 in preparation for a tape withdrawal operation.

When tape is loaded about guide drum 112 by the automatic tape loading apparatus schematically depicted in FIG. 2, the tape engaging member 51′ engages the run of tape Ta and withdraws tape from the cassette or cartridge 1 to wrap the withdrawn tape about the appropriate elements previously described with respect to FIG. 2 and described in greater detail in aforementioned U.S. Pat. application Ser. No. 113,988. In accordance with a preferred feature of the present invention, the withdrawal of tape from the cassette or cartridge is effected by withdrawing the tortuous run Tb from storage compartment 15, thereby obviating any increase in tension in the wound tape TR. Preferably, that portion of tape Tb stored in storage compartment 15 is approximately equal to that portion of tape withdrawn from the cassette or cartridge and loaded about the magnetic recording and/or reproducing apparatus. It is appreciated that as the tape stored in storage compartment 15 is withdrawn therefrom, the spring biasing force exerted on arm 54 by spring 55 is overcome to pivot the arm about pin 54′, thereby bringing pinch roller 53 out of physical contact with driving roller 11. Therefore, it is readily seen that the wound tape TR deployed about reel 12, center post 35 and damper means 37 is not undesirably tightened when tape is withdrawn from the cassette or cartridge 1 and loaded onto the magnetic recording and/or reproducing apparatus.

One loaded, the tape T is transported through the magnetic recording and/or reproducing apparatus by driving drive roller 11 by a suitable drive shaft provided in the magnetic recording and/or reproducing apparatus and by driving the capstan 116 schematically illustrated in FIG. 2. It is appreciated that as roller 11 is driven, the motive force imported thereto is transmitted to reel 12 by the endless cable or belt 13 to correspondingly drive the reel in the direction indicated by arrow B. Furthermore, as tape T is transported from the innermost coil of wound tape TR, about tape separator 36, about tape guide 39, about guide members 44, 45 and 47, along run T′ to the magnetic recording and/or reproducing apparatus, and along the return run T″, about guide member 48*b*, about pinch roller 53, through slit 19, through storage compartment 15, and through slit 20 to return to the outermost coil of wound tape TR, it is appreciated that the wound tape TR is rotated about its extended path in response to the rotation of reel 12 and in response to the force exerted thereon by the withdrawn tape T. Thus, as tape is pulled from the wound tape TR, the wound tape is forced to rotate. However, because of the rotation of reel 12 and the relatively low coefficient of friction existing between the wound tape TR and the supporting elements therefor (i.e., support plate 38 and support flange 30), the wound tape is not subjected to a substantial increase in tension and, thus, is not tautly wound. Consequently, the problem of vibration in the transported tape previously experienced by prior art devices is here overcome. Deleterious effects upon the signals recorded on or reproduced from the transported tape are here obviated.

When the tape T is to be unloaded from the magnetic recording and/or reproducing apparatus subsequent to a signal processing operation, the tape engaging member 51′ is returned to its illustrated position, thereby removing the tape tensioning force previously exerted thereby. Accordingly, the spring biasing force exerted on arm 54 by spring 55 is no longer overcome and arm 54 is permitted to pivot about pin 54′ to thus return pinch roller 53 into physical contact with driving roller 11. In this position, tape gripped between pinch roller 53 and driving roller 11 is transported along tortuous run T*b* into storage compartment 15 in response to the driving force exerted upon roller 11. When the withdrawn tape is thus returned to the cassette or cartridge 1 such that a run of tape T*a* extends between guide members 47 and 48*a*, the cassette or cartridge may be removed from the magnetic recording and/or reproducing apparatus.

It is appreciated that the novel cassette or cartridge described herein above is provided with an endless reel of tape, in contradistinction to the conventional reel-to-reel cassette or cartridge heretofore employed with magnetic recording and/or reproducing apparatus. Nevertheless, the cassette or cartridge in accordance with the instant invention finds ready application with such magnetic recording and/or reproducing apparatus. Thus, the housing 3 is provided with a pair of apertures to receive the pair of drive shafts normally provided in such apparatus. However, only driving roller 11 is adapted to engage a drive shaft to be rotatably driven thereby. It is noted that reel 12 admits of overlying relationship with respect to a drive shaft of the magnetic recording and/or reproducing apparatus, but is free from rotatable engagement therewith.

Referring now to FIGS. 10 and 11, there is illustrated another embodiment of the instant invention wherein like component parts are here identified by like reference numerals previously employed in FIG. 3. Thus, driving roller 11 is rotatably mounted on a suitable upstanding abutment provided on the bottom wall 2′ of housing 3. Pinch roller 53 is rotatably mounted on arm 54, the latter being pivotably fastened to the bottom wall 2′ by a suitable pivot pin 54′ and biased into contact with driving roller 11 by spring 55. Although the bottom wall 2′ is illustrated as being provided with an axle stub 32, the present embodiment contemplates wound tape TR deployed about a pair of reels 201 and 202 disposed in spaced apart relation and rotatably mounted in housing 3. It is appreciated that by employing the pair of reels 201 and 202, the previously described damper means 37 and center post 35 are here not necessary to provide the preferred extended path about which the wound tape TR rotates.

A shield plate 140 supported on legs 143 and 143′ extends in overlying relation with respect to the wound tape TR and is provided for a purpose similar to that previously described with respect to shield plate 40. Accordingly, the upper surface of shield plate 140 is coated with a substance having a low coefficient of friction, such as polytetrafluoroethylene. The shield plate 40 cooperates with guide member 139 to define a tape run extending from the innermost coil of wound tape TR, over shield plate 140 and about guide member 139 to guide pin 147. Guide member 139 is substantially similar to aforedescribed guide member 39 and is comprised of guide bar 142 secured to bottom wall 2′ by support 141. It is appreciated that the run of tape extending about guide bar 142 is reversed thereby.

A suitable tape tension guide 145, similar to aforedescribed tension guide 45, is mounted on flexible member 46, the latter being secured to partition 50. In the illustrated embodiment, the tension guide 145 is rotatably mounted on flexible member 46 and thus rotates with tape T deployed thereabout. The tension guide 145 provides suitable tensioning to the tape T as said tape is transported about guide member 139 to guide pin 147.

A storage compartment 115 is defined by vertical walls 116, 117 and 118 projecting upwardly from bottom wall 2'. Walls 116 and 117 are spaced to define a slit 119 therebetween and walls 116 and 118 are, likewise, spaced to define slit 120. Slit 119 comprises a suitable ingress to storage compartment 115 and slit 120 comprises a suitable egress therefrom. Tape is stored in compartment 115 in a suitable tortuous or randomly serpentine run T*b*.

Although not shown herein, it is appreciated that the driving force imparted to roller 11 by a suitable drive shaft in engagement therewith may be transmitted to reel 201 or reel 202 by suitable power transmission means such as an endless cable or belt, previously described. Other suitable power transmission devices are contemplated.

The operation of the embodiment illustrated in FIGS. 10 and 11 is substantially similar to that described hereinabove with respect to FIG. 3. Therefore, in the interest of brevity, further description thereof is not provided. However, it should be well understood that, during the loading of tape T about the operable components of the magnetic recording and/or reproducing apparatus, tape is withdrawn from storage compartment 115. Accordingly, the wound tape TR is not subjected to an increase in tension nor is said tape wound too tightly. Hence, that portion of tape Tb stored in storage compartment 115 in the illustrated torturous configuration is preferably approximately equal to that portion of tape withdrawn from the cassette or cartridge 1 and loaded onto the magnetic recording and/or reproducing apparatus. As expected, the loading operation of tape exerts a tensioning force on pinch roller 53 sufficient to overcome the spring biasing force exerted by spring 55 to thus displace the pinch roller from physical contact with the peripheral surface of driving roller 11. Of course, when tape is unloaded from the magnetic recording and/or reproducing apparatus, spring 55 is again permitted to exert sufficient biasing force on arm 54 to return pinch roller 53 into the illustrated configuration. Thus, during the loading operation, the tape is not drawn from guide member 139 about tension guide 145 and guide pin 47.

It is recognized that, during the recording of signals on or the reproduction of signals from tape T, said tape is transported from the innermost coil of wound tape TR, over shield plate 140, about tape guide member 139, about tension guide 145, about guide pin 47 via tape run T', to the magnetic recording and/or reproducing apparatus, and from said apparatus along tape run T'', about pinch roller 53, through slit 119, through storage compartment 115, and through slit 120 to the outermost coil of wound tape TR. As the tape is driven through the magnetic recording and/or reproducing apparatus, the drawn tape serves to rotate the wound tape TR. Accordingly, to minimize friction between the wound tape TR and those elemental components in physical contact therewith, such components may be coated with substances having a low coefficient of friction, such as polytetrafluoroethylene. Additionally, a support plate, similar to aforedescribed plate 38, may be provided between reels 201 and 202, if desired.

When the tape is unloaded from the magnetic recording and/or reproducing apparatus, the return of pinch roller 53 into contact with driving roller 11 serves to transport the tape T into storage compartment 115 to thereby define the tortuous run Tb thereof. It is appreciated that when the tape is returned to storage compartment 115 during the tape unloading operation, tape T is not transported from the innermost coil of wound tape TR about tape guide member 139 and, therefore, said wound tape is not subjected to an undesired increase in tension bar nor is the tape unnecessarily advanced.

While the invention has been particularly shown and described with reference to exemplary embodiments thereof, it will be obvious to those of ordinary skill in the art that various other changes and modifications in form and details may be made without departing from the spirit and scope of the invention. Additionally, although the instant invention is preferably adapted for use in conventional magnetic tape recording and/or reproducing apparatus, such as VTR apparatus, no specific restrictions on the use thereof are contemplated. It is therefore intended that the appended claims be interpreted as including all obvious changes, modifications and applications.

What is claimed is:

1. An improved tape cartridge comprising a housing having an access opening and partition means dividing the interior of the housing into a main compartment which opens to the exterior of the housing at said access opening and a storage compartment which communicates with said main compartment at an entry and an exit defined by said partition means, an endless loop of tape having its major portion wound to form a coil, means rotatably supporting said coil within said main compartment, a drive roller rotatably mounted within said main compartment adjacent said entry to the storage compartment and adapted to be rotated from the exterior of said housing, guide means within said housing including guide members adjacent the opposite sides of said access opening for guiding said tape in a run that extends from the innermost winding of said coil across said access opening and from the latter into said entry of the storage compartment and out of said exit of the latter back to the outermost winding of said coil, a substantial portion of said run of the tape being normally disposed in loose serpentine folds within said storage compartment, the tape in said run between said guide members being withdrawable from said housing through said access opening for the recording and reproducing of signals on the withdrawn tape at the exterior of said housing, a freely rotatable pinch roller in said main compartment adjacent said drive roller, means supporting said pinch roller for movement of the latter generally toward and away from said drive roller, said pinch roller engaging said run of the tape at the portion thereof between one of said guide members and said entry to the storage compartment and forming a bend in said portion of the tape run with the tape between said one guide member and said pinch roller being directed so that tension therein tends to move said pinch roller away from said drive roller and with the tape engaged by said pinch roller facing toward said drive roller, and spring means yieldably urging said pinch roller against said drive roller for driving by the latter of the tape therebetween into said entry of the storage compartment, the force of said spring means being selected to be overcome by an increased tension in said tape between said one guide member and said pinch roller in response to the withdrawal of tape through said access opening for moving said pinch roller away from said drive roller and permitting the tape constituting said loose serpentine folds to run out of said storage compartment through said entry.

2. An improved tape cartridge in accordance with claim 1; wherein said means rotatably supporting said coil includes a pair of reels disposed in spaced apart relation and rotatably mounted in said main compartment.

3. An improved tape cartridge in accordance with claim 2; wherein said guide means further includes shield means disposed in overlying relation with a portion of said coil for receiving tape from said innermost winding, and a guide bar secured to said housing, said shield means and guide bar guiding said tape in a path extending over said coil to thereby permit said tape to be transported from said guide bar through said access opening to the exterior of said housing.

4. An improved tape cartridge in accordance with claim 3; wherein said shield means shields the tape in said path extending over said coil from contact with said coil and has an upper surface having a relatively low coefficient of friction with respect to said tape.

5. An improved tape cartridge in accordance with claim 1; wherein said means rotatably supporting said coil includes at least one reel rotatably mounted in said main compartment.

6. An improved tape cartridge in accordance with claim 5; further comprising damper means mounted in said main compartment of the housing adjacent said reel for extending the path defined by said tape coil supported by said reel to thereby permit said tape to be transported from the innermost winding of said tape coil to said access opening, and for restraining vibration of said coil.

7. An improved tape cartridge in accordance with claim 6; wherein said drive roller is drivingly coupled to said reel to rotatably drive said reel when said roller is rotated.

8. An improved tape cartridge in accordance with claim 6; wherein said guide means further includes a tape separator disposed interiorly of said coil and about which said tape is guided from said innermost winding, and a guide bar secured to said housing, said tape separator and said guide bar guiding said tape in a path extending over said coil to thereby permit said tape to be transported from said guide bar through said access opening to the exterior of said housing.

9. An improved tape cartridge in accordance with claim 8; further comprising shield means for shielding said tape in said path extending over said coil from contact with said coil.

10. An improved tape cartridge in accordance with claim 9 further comprising a guide plate for supporting a portion of said coil extended from said reel, said guide plate having a surface that has a relatively low coefficient of friction with respect to said tape.

* * * * *